March 18, 1958     S. M. McCURDY     2,827,204
GRAVITY FLOW CROP HANDLER

Filed May 25, 1956                                                2 Sheets-Sheet 1

Inventor
Sanford M. McCurdy
By
Attorney

March 18, 1958  S. M. McCURDY  2,827,204
GRAVITY FLOW CROP HANDLER
Filed May 25, 1956  2 Sheets-Sheet 2

Inventor
Sanford M. McCurdy
By
Attorney

United States Patent Office 2,827,204
Patented Mar. 18, 1958

2,827,204

GRAVITY FLOW CROP HANDLER

Sanford M. McCurdy, Ada, Ohio, assignor to McCurdy Steel Products Company, Ada, Ohio, a corporation of Ohio Application May 25, 1956, Serial No. 587,265

1 Claim. (Cl. 222—176)

My invention relates to agricultural equipment for the handling, i. e. collection, conveyance and delivery, of agricultural crops, such as crops of ear or shelled corn, grain, beets, potatoes, seed and other hard garden and orchard produce. Stated with more particularity, my invention concerns a mobile grain box whose walls form an open-top, hopper-like chamber with a centrally disposed discharge throat from which a transverse extending chute projects to enable gravity flow of the grain box contents to one side of the grain box as say to drag equipment, such as that used in planting, or to the elevator or bagger equipment, such as that used in preparation for crop storage, milling or the like.

Most particularly, my invention concerns the provision of a door or gate means for controlling the crop flow through said discharge opening and along said chute. In the combination comprising such door or gate means, my invention provides a manually operable handwheel by which the movement of the gate to open and close the way along the chute and thus the quantity flow of the box contents therealong, in a given time period, may be precisely controlled. This is particularly important when the crop handler is used with a planting drag whose capacity to handle the contents of the flow box is limited by the structure of the drag as well as the speed of its ground movement.

Another object of my invention is to provide a simple, sturdy and low cost crop handler which is self-unloading with a free and positive gravity flow.

My invention has for further objects to provide other advantageous structures and arrangements which will appear from the following description and from an examination of the accompanying drawings. Gravity flow crop handlers containing my invention may take various forms, one of which at this time appears to me to be the best mode of carrying out my invention. I describe that form hereinafter and in doing so make reference to the accompanying drawings. I do not imply by such description or reference that variation from the form described or shown is beyond the contemplation of my invention.

Figure 1:
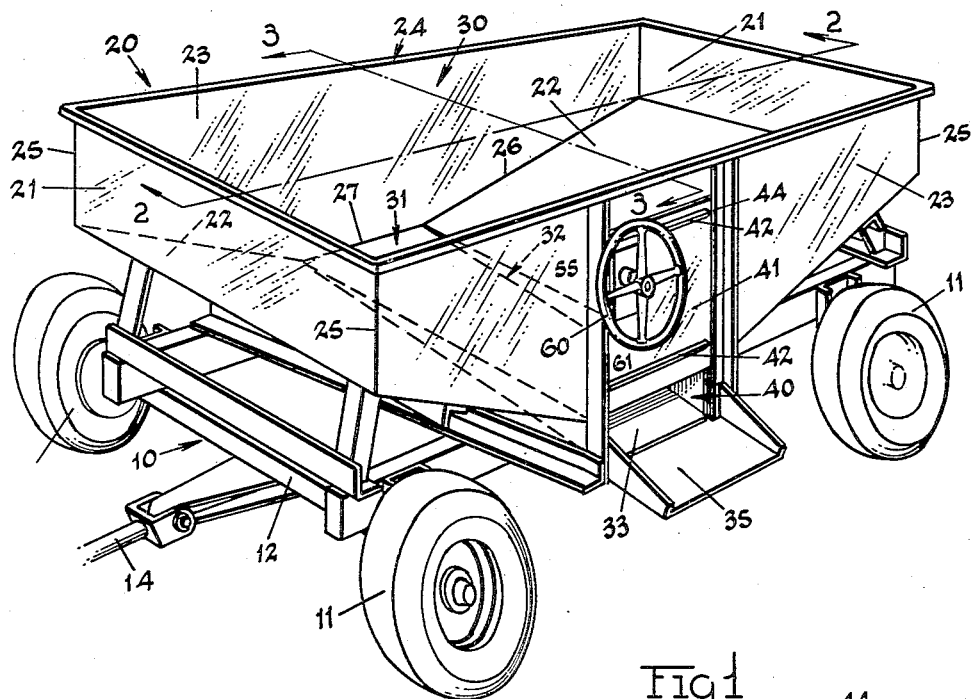
Figure 4:
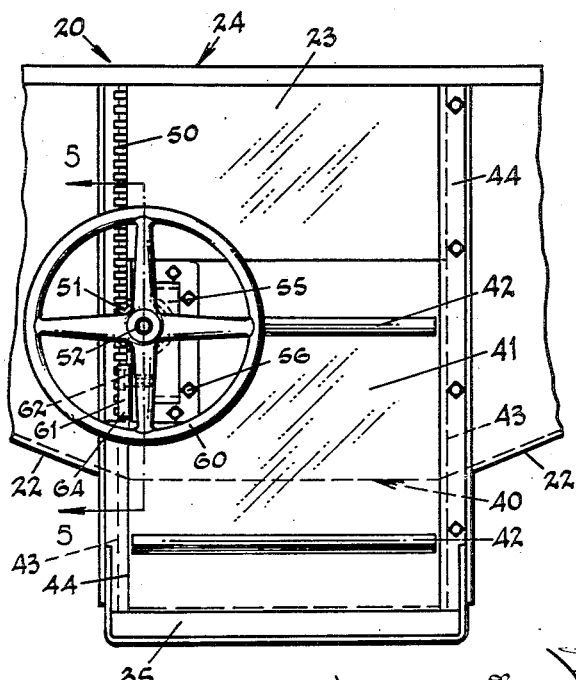
Figure 5:
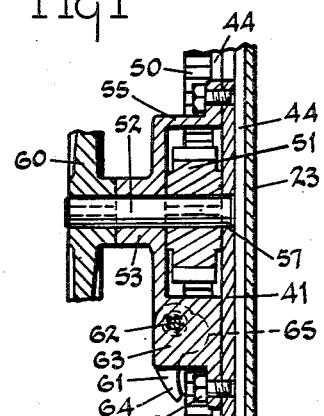
Figure 2:
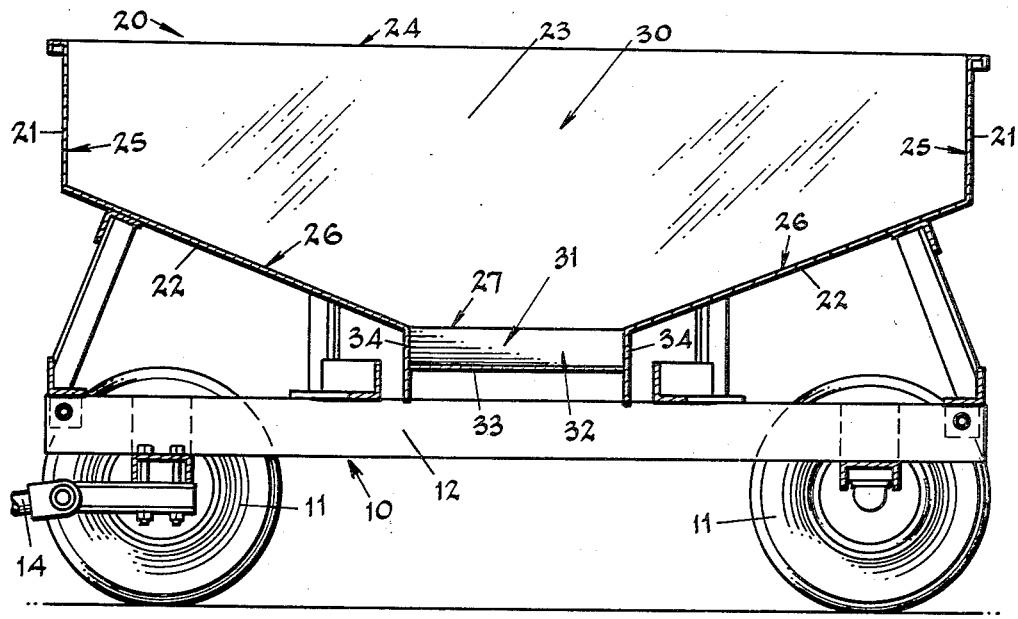
Figure 3:
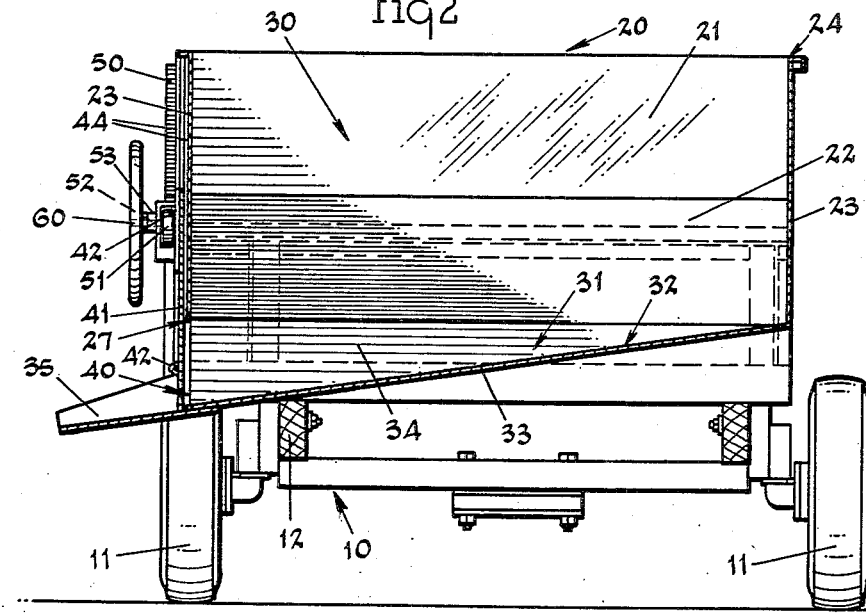

Figure 1 is a perspective view of a gravity flow crop handler embodying the features of my invention. Figure 2 illustrates a view of a section of the crop handler taken along the plane of the line 2—2 indicated in Figure 1. Figure 3 illustrates a view of another section, this one being taken along the plane of the line 3—3 indicated in Figure 1. Figure 4 illustrates an enlarged front view of the door or gate means and the operating mechanism therefor. Figure 5 illustrates a view of a section taken along the plane of the line 5—5 indicated in Figure 4.

With the increased use of power tractors, mobile grain boxes are rapidly becoming essential elements in the agricultural work picture. Not only do they serve the purpose of crop loaders and conveyors but, in the increasingly common practice of using tandem arranged mechanical planting and working equipment, they serve importantly to supply the seed or planted sections to such planters and workers.

Essentially, such mobile grain boxes must be sturdy of structure and simple of operation. Notwithstanding such sturdiness and simplicity, the full advantage can not be had from the equipment unless the flow from the box may be sensitively and easily controlled; particularly, so that such flow shall be in tune with the planter operations under conditions requiring almost none but an initial setting supervision.

To provide the desired mobility, a gravity flow crop handler embodying my invention, such as the one illustrated in the accompanying drawings, has a mobile chassis 10. The chassis 10, may have suitable pneumatic tired wheels 11 rotatably mounted on a frame 12. One end of the frame 12 has a draw bar 14 connected thereto. The draw bar 14, through suitable well known linkages not shown in the drawings, may be connected to turning mechanisms for the lead wheels 11. Thus, when the draw bar 14, is hitched to some suitable source of pulling power, such as a tractor, and the chassis 10 caused to move thereby, the chassis will follow and track in the path through which the tractor may lead.

The mobile chassis 10 supports a box body, such as that indicated generally as 20 in the accompanying drawing. The box body forms an open-top, hopper-like chamber into which a flow crop, such as a crop of ear or shell corn, grain, beets, potatoes, seed and other hard garden or orchard produce may be loaded. In the particular form shown in the accompanying drawing, the box body 20 has and is formed by a pair of opposite end walls 21, a pair of opposite bottom walls 22, and a pair of opposite side walls 23.

The end walls 21 are preferably of rectangular outline and fully coincide with each other. Also, the bottom walls 22 are preferably of coinciding rectangular outline. However, the side walls 23 are of coinciding irregular octagonal outline. Each side wall 23 has a rather long horizontally extending upper edge 24. Depending from opposite ends of the upper edge 24, each side wall has two relatively shorter end edges 25. The edges 25 extend downwardly at right angles to the upper edge 24. From the lower ends of end edges 25 and extending inclinedly thereto and towards each other, each side wall 23 has a pair of inclined bottom edges 26. The ends of the bottom edges 26 join each other through the medium of a third bottom edge 27, extending parallel to the upper edge 24 and forming the eighth side of each octagonal side wall 23.

The end walls 21 and bottom walls 22, join the side walls 23 to form the box body 20. Preferably, the end walls 21 engage the side walls 23 along the end edges 25 of the opposite side walls. Also, preferably, the bottom walls 22 engage the side walls 23 along the inclined bottom edges 26 of the spaced side walls. Hence, by the above described engagement of the walls an open-top, hopper-like chamber 30 will be formed by said walls. The chamber 30 will have a centrally disposed throat 31 between the spaced lower edges of the inclined bottom walls 22 and the bottom edges 27 of the two side walls 23.

In order that the crop contents placed in the chamber 30 may not flow through the throat 31 and to relatively inaccessible regions below the frame 12, as in some prior art structures, my invention contemplates the provision of a chute 32, extending beneath the throat 31. The chute 32 has a floor 33 with opposite side rails 34. The chute is suitably connected to the walls of the chamber 30, preferably to the bottom edge 27 of one side wall 23 and to the lower edges of the bottom walls 22 and so that the chute floor 33 is in an inclined vertical and transverse horizontal relation to the side walls 23. Thus, the chute 32 extends at right angles to and downwardly from one side wall 23 along a line passing beneath the bottom edge 27 of the other side wall 23 to a lip edge 35 of the chute at a point to one side of the box body 20 and outside the track path of the chassis wheels 11.

Thus, when the box body 20 contains flow crop elements, gravity will induce such elements to flow downwardly through the chamber 30 into the throat 31 and then transversely along the chute 32 to the lip edge 35 at a point on one side of the flow box and outside the path through which chassis wheels 11, in movement, track.

The chute floor 33, its side rails 34 and the bottom edge 27 of the side wall 23 under which the chute 32 extends form a discharge opening 40. In order to control such opening 40, I provide a door or gate 41. The gate 41 is preferably plate in form, having parallel upper and lower reenforcing cross-bars or stiffeners 42. The gate is slidably supported along its edges 43 in slide bearings 44 formed and mounted on the exterior of the side wall 23 beneath which the discharge opening 40 occurs. The gate 41 is held by the bearings 44 for up and down movement thus to open and close the discharge opening 40 and thereby controlling flow through such opening.

In order to raise the gate 41, I provide the combination of a toothed rack 50 and a therewith meshing pinion 51. The rack 50 may be a casting mounted on the exterior of the side wall 23 and preferably on the exterior of one of the mentioned slide bearings 44. The pinion 51 is keyed to a stub shaft 52. The shaft 52 is rotatably mounted in a journal 53, formed in a gear case housing 55 fixed, as by fasteners 56, to an upper corner of the gate 41. A second journal 57 formed in the gate 41 also cooperates to support the shaft 52. The shaft and its journals 53 and 57 are disposed so that the pinion 51 meshes at all times with the rack 50.

To controllably rotate the shaft 52 and hence the pinion 51, I mount and key a handwheel 60 on the shaft 52. When the handwheel 60 is rotated in one direction, the pinion 51 will be caused to rotate and "climb up" or move over the rack 50, lifting the gate 41 to an open position. The degree to which the gate is moved to an open position can be precisely determined and controlled by the extent and increments of rotation of the handwheel. As the gate rises to open, the handwheel also moves upwardly and thus is removed from any position of interference with respect to the gate or the outward flow from the discharge opening 40.

When it is desired to close the gate, one need merely to release the handwheel 60 and the weight of the gate 41 causes the pinion 51 to track down over the rack 50, until the lower edge of the gate 41 engages the chute floor 33 closing the discharge opening 40. In order, however, to retain the gate 41 in some desired open position, after the handwheel 60 has been released, I provide a dog or pawl 61 to engage the rack 50. The pawl 61 is pivotally mounted, as by a bolt 62 in a boss 63 on the housing 55. The pawl has a beak 64 designed to engage the teeth of rack 50 when the pawl 61 is manually manipulated about the axis of its supporting bolt 62. When so manipulated, the pawl 61 sustains the gate 41 in a raised open position.

If desired, the pawl 61 may have a mass portion 65, offset from the axis of the pawl supporting bolt 62. Such mass portion 65, when the pawl is positioned so that its beak 64 engages the rack 50, will exert a torque on the pawl tending to move the pawl from rack engaging position. Thus, when it is desired to release the pawl 61 from rack engagement, the user need merely rotate the handwheel 60 enough to just slightly raise the gate 41 and the mass portion 65 of the pawl causes the pawl to automatically swing out from engagement with the rack. Now, by releasing the handwheel 60, the gate 41 moves automatically to closure.

Thus, it will be seen I have provided a truly simple but exceedingly adaptable gravity flow crop handler. The gate operating means by virtue of the relative diameters of handwheel 60 and pinion develops adequate power assuring easy lifting of the gate, even under conditions when the contents in the grain box 20 are packed and pressing against the inside of the gate and thereby tending to resist such opening. In addition, such arrangement retains control over such gate lifting movement so that the application of needed power will not produce over movement of the gate past that desired under the conditions.

I claim:

In a gravity flow crop handler, in combination, a mobile chassis and a box body on and supported by said chassis; said box body having two opposite end walls of coinciding rectangular outline, two opposite bottom walls of coinciding rectangular outline and two opposite side walls of coinciding irregular octagonal outline; each of said side walls having a long horizontally extending upper edge, two relatively shorter end edges depending in normal angular relation from opposite ends of said upper edge, two bottom edges in inclined and mutually approaching relation to said end edges and a third bottom edge of short length in parallel relation to said upper edge and joining the inner ends of said two inclined bottom edges; said end walls being in engagement with said side wall along said end edges thereof, said bottom walls being in engagement with said side wall along the inclined bottom edges thereof, said end and bottom walls extending between the opposite side walls to form an open-top hopper-like chamber with a centrally disposed bottom opening between the lower edges of said inclined bottom walls; a chute in engagement with the lower edges of said inclined bottom walls and extending in transverse and downwardly inclined relation from one of said side walls toward the other of said side walls and forming a discharge opening beneath the third bottom edge of the last named side wall; and means for closing said discharge opening comprising a gate; slide bearings on the exterior of said last named side wall in slidable engagement with vertically extending edges of said gate for slidably supporting the gate for vertical movements across said discharge opening; a rack on the exterior of said last mentioned side wall; a pinion; a stub shaft in engagement with and keyed to said pinion, said stub shaft being in engagement with said gate and rotatably supported thereon for movement therewith and for rotation about an axis extending approximately at right angles to the gate and thereby to support the pinion in engagement with said rack; a handwheel in engagement with said stub shaft and extending in a plane substantially parallel and close to said last named side wall whereby rotation of said handwheel is in a plane parallel and close to said gate and when rotated in one direction causes said pinion to rotate and move over the rack lifting the handwheel and the gate to open said discharge opening; a pawl; and means on the gate in engagement with said pawl for pivotally supporting the pawl thereon in a position to engage said rack to thereby prevent the gate, when raised to an open position, from falling to a closed position; the pawl having a center of mass offset from its axis of pivotal support and operative to bias said pawl out of engagement with said rack thereby to free the gate for closing movements when preparatory thereto the gate is momentarily moved upwardly along said slide bearings.

References Cited in the file of this patent

UNITED STATES PATENTS

| | | |
|---|---|---|
| 394,369 | Johnston | Dec. 11, 1888 |
| 1,219,737 | Heilig | Mar. 20, 1917 |
| 1,545,376 | Weatherby | July 7, 1925 |
| 2,158,429 | Sale | May 16, 1939 |
| 2,238,296 | Stock | Apr. 15, 1941 |
| 2,260,433 | Cadwell | Oct. 28, 1941 |
| 2,582,207 | Shaw | Jan. 8, 1952 |